United States Patent
Rosa

Patent Number: 5,918,173
Date of Patent: *Jun. 29, 1999

[54] METHOD FOR FOILING CELLULAR TELEPHONE CLONING

[76] Inventor: Stephen P. Rosa, 12213 Mt. Albert Rd., Ellicott City, Md. 21042

[*] Notice: This patent is subject to a terminal disclaimer.

[21] Appl. No.: 08/862,252

[22] Filed: May 23, 1997

Related U.S. Application Data

[63] Continuation-in-part of application No. 08/517,867, Aug. 22, 1995, Pat. No. 5,633,914.

[51] Int. Cl.$^6$ ...................................................... H04Q 7/38
[52] U.S. Cl. ........................... 455/411; 455/410; 379/145
[58] Field of Search ...................... 379/59, 145; 455/410, 455/411

[56] References Cited

U.S. PATENT DOCUMENTS

| | | | |
|---|---|---|---|
| 5,204,902 | 4/1993 | Reeds, III et al. | 380/23 |
| 5,210,787 | 5/1993 | Hayes et al. | 379/60 |
| 5,237,612 | 8/1993 | Raith | 380/23 |
| 5,239,294 | 8/1993 | Flanders et al. | 340/825.34 |
| 5,420,908 | 5/1995 | Hodges et al. | 379/58 |
| 5,420,910 | 5/1995 | Rudokas et al. | 379/59 |
| 5,633,914 | 5/1997 | Rosa | 379/59 |

Primary Examiner—Wellington Chin
Assistant Examiner—Isaak R. Jama

[57] ABSTRACT

A method for foiling cellular telephone cloning by verifying subscribers of a cellular communications network is accomplished by having each subscriber provide a multi-digit verification number (for example, a local telephone number, typically not his/her own), unique to that subscriber, to the cellular telephone company and long distance carrier to verify legitimate subscribers. The verification numbers provided by the subscribers are stored in respective databases and correspond to electronic serial numbers of subscriber telephones. Shortly after each power-up of the cellular telephone, the subscriber either invokes an automatic dialer or manually dials the verification number. A computer in the cellular network receives the subscriber's first call (containing an electronic serial number, network identification and verification number) after power-up and verifies the dialed verification number against the verification number stored in the database. In response to a match, the cellular network transmits a single ring to the subscriber telephone as confirmation of a verification; otherwise a message requesting enablement of the cellular telephone is transmitted to the subscriber telephone. A similar process is implemented in the long distance carrier to verify legitimate subscribers when they travel to an area not serviced by their local cellular network. The non-local cellular network receives a call and routes the information to the subscriber's long distance carrier for verification. Alternatively, the long distance carrier may forward the information to the subscriber's local cellular network for verification.

21 Claims, 3 Drawing Sheets

METHOD FOR FOILING CELLULAR TELEPHONE CLONING

CROSS-REFERENCE TO RELATED APPLICATION

This application is a continuation-in-part of my U.S. patent application Ser. No. 08/517,867, filed Aug. 22, 1995, now U.S. Pat. No. 5,633,914, and entitled "Method For Foiling Cellular Telephone Cloning".

BACKGROUND OF THE INVENTION

1. Technical Field

The present invention relates to a method for foiling cellular telephone cloning by utilizing a multi-digit number (e.g., a local telephone number other than the subscriber's telephone number and identification code) to verify legitimate subscribers of a cellular communications network.

2. Discussion of Prior Art

Cellular telephones, especially automobile cellular telephones, have come to provide a widespread method of communication. Unfortunately, this modern method of communication has been subjected to increased thefts of service thereby creating large financial losses for the cellular telephone companies. Periodically during operation, each cellular telephone must transmit a mobile identification number (MIN) identifying the cellular network to which the cellular telephone belongs (i.e. Cellular One, Bell Atlantic, etc.) and an electronic serial number (ESN) identifying the particular cellular telephone in order for a call to commence. These identification numbers are commonly unlawfully intercepted during transmission in order to be inserted into semiconductor chips and placed in new telephones forming what are known as "clones". These clones are capable of initiating countless telephone calls over the cellular network, thereby causing exorbitant fees to be charged to the subscriber whose identification numbers had been intercepted. The clones are indistinguishable from legitimate subscribers and are not detected until a subscriber receives an inordinate bill from his or her cellular telephone company. Since cellular telephone companies typically do not require subscribers to pay for calls made by the clones, the cellular telephone companies absorb the cost of the stolen service.

The prior art has developed several methods to prevent such thefts. Specifically, Cellular One has developed a fraud protection feature utilizing personal identification numbers (PIN) to enable the fraud protection feature when the cellular telephone is not in use and to disable the fraud protection feature during outgoing calls. The fraud protection feature does not require the PIN to be entered for every call and allows for incoming calls when the fraud protection feature is enabled. Further, other prior art uses of PINs include verification of subscribers by having the subscriber dial the PIN as part of every telephone call.

Hodges et al (U.S. Pat. No. 5,420,908) disclose a method for preventing wireless fraud by utilizing a shared key to complete a proper authenticating response to verify legitimate subscribers of a communication network. The shared key is not broadcast and therefore cannot be intercepted.

Flanders et al (U.S. Pat. No. 5,239,294) disclose an authentication method whereby a first I.D. (such as a serial number) is modified by using a second (personal identification number) and third (random number) I.D. as enciphering keys. The first I.D. is known to both fixed and mobile units. The mobile unit further maintains a count of the number of outgoing calls and sends the count and the modified first I.D. to the fixed unit. The fixed unit performs the same enciphering on the data received from the mobile unit and determines if the serial number of the mobile unit is valid.

Raith (U.S. Pat. No. 5,237,612) discloses an authentication algorithm utilizing a fixed and changeable key to verify subscribers in a communication network. The authentication algorithm generates responses based on signals from both the communication network and mobile subscriber for comparison to verify valid subscribers.

Reeds III et al (U.S. Pat. No. 5,204,902) disclose an authentication method whereby a mobile unit is assigned a secret code by a service provider and generates a shared secret field. In response to the mobile unit entering a cell of a base station, the mobile unit generates an authentication string to transmit to the base station. The base station consults the service provider to verify the mobile unit, and when the mobile unit is verified, the service provider sends the secret data field to the base station to authenticate and communicate with the mobile unit utilizing the secret data field.

The prior art suffers from several disadvantages. Personal identification numbers (PIN) are typically only four digits in length thereby providing for easy recognition and deciphering with the aid of a computer. The four digit PIN can only handle a limited number of subscribers inevitably requiring expansion of the PIN as the number of subscribers increase. The recurring expansion of the PIN causes inconveniences to subscribers and incurs costs as new PINs typically require a rework of the databases for storing the PINs and a redistribution of the PINs. Further, since the PIN is four digits, the PIN cannot be stored in the cellular telephone memory due to the PIN containing less digits than a typical telephone number. In addition, the PIN may not be appended to a telephone number as an appended PIN may be construed as a new area code or part of an international call. As a consequence, the subscriber is required to remember the cellular PIN along with other PINs the subscriber may already possess for credit cards and bank machines thereby causing a major burden to the subscriber and possible subsequent declines in cellular telephone usage and enrollment. A further complication in utilizing PINs is the recommendation of security experts that the PIN include at least ten digits for adequate security thereby placing the burden on subscribers to remember and enter such a long PIN. Moreover, PINs are used only for a specific cellular network and do not prevent telephone service theft when a clone communicates with another cellular network.

PINs are inconvenient and expensive since subscribers may be forced to enter the PIN as part of every call in certain security schemes and widespread implementation of PINs by cellular telephone companies requires substantial investment typically exceeding the costs of implementing the present invention. Further, subscribers traveling to an area covered by a non-local cellular network must transmit the PIN and other call information to the non-local cellular network where the information is transmitted to the long distance carrier and/or local cellular network for verification thereby giving thieves a greater chance of intercepting and recognizing the PIN and other pertinent information in order to fabricate clones. In order to avoid re-transmission of the information to the long distance carrier and/or local cellular network, the local cellular telephone companies need to maintain separate databases for local and non-local subscribers thereby requiring agreements between the cellular telephone companies who are reluctant to enter such agreements. Further, the additional databases typically may raise database management problems (i.e. validation, set-up, updating, etc.).

Yet another disadvantage of the prior art includes the extra time, effort, expense and labor to implement and maintain authentication algorithms to verify responses based on encryption keys.

OBJECTS AND SUMMARY OF THE INVENTION

Accordingly, it is an object of the present invention to enable or verify a cellular telephone for an entire session (power-up until power-down of the cellular telephone) with a single transmission each time power is applied to the subscriber's telephone.

Another object of the present invention is to verify a valid subscriber on the basis of a multi-digit verification number which, in one example, may be a working telephone number of someone other than the subscriber (e.g., of a friend) where, as an option, the verification number can be pre-stored in the cellular telephone and an auto-dial feature initiates the its transmission to effect verification. Further, the use of a telephone number as the verification number is preferred for verification purposes because it is adequately secure as ten digits are used (area code and telephone number), easier to remember than a conventional PIN as the telephone number is associated with a person and utilized in everyday life, and not discernable to thieves upon interception of a transmission as the verification information simulates and appears to the thief as an actual telephone call. Nevertheless, the present invention is not limited to the use of a telephone number as the multi-digit verification number. In this regard, the most important aspect of the invention is the single transmission of the verification number each time that power is turned on for the telephone (i.e., there are no periodic transmissions of the verification number during the power on cycle, as there are with the separate and independent identification number)that would provide prospective cloners with multiple opportunities to receive and record the verification number.

Yet another object of the present invention is to provide an authentication process that has the capability to prevent fraud when the cellular telephone is serviced by other non-local cellular networks.

Still another object of the present invention is to protect cellular telephones currently in operation as well as newly produced cellular telephones.

A further object of the present invention is to provide an authentication process that is not a burden to the end user, either in time, cost or inconvenience.

Yet another object of the present invention is to provide an authentication process that can be implemented with a minimum of investment by the cellular telephone companies, using data processing and communication technologies that are well within the state of the art.

Still another object of the present invention is to provide an authentication process that is highly conducive to and supportive of unlimited growth in the cellular network subscriber roles without modification.

According to the present invention, a method for foiling cellular telephone cloning is accomplished by use of a multi-digit verification number, such as a telephone number of a person with whom the subscriber would not be readily connected by a thief (e.g., an acquaintance or friend) to verify the subscriber to the cellular network. The subscriber provides the verification number to a representative of the cellular telephone company. The verification number may be any unique multi-digit number of prescribed number of digits. If the verification number is a telephone number, it is preferably a valid telephone number assigned within the same local network area of the cellular telephone company (i.e. a local telephone call) but is preferably not the telephone number assigned to the subscriber. The verification telephone number need not be, and is preferably not, another cellular telephone number, as this limits the search areas a thief must "tumble" to find the verification number. The verification number and corresponding ESN are then entered into a database to identify the subscriber, and may also be programmed into the cellular telephone to utilize an auto-dial feature so that the verification number may be transmitted by depressing the fewest possible keys.

After power-up of the cellular telephone, the subscriber sends the verification number, ESN and MIN to the cellular network by either depressing the auto-dial keys or manually dialing in the numbers. If the verification number is the telephone number is that of a friend, remembering the verification telephone number for manual dialing should be less of a burden to the subscriber. The ESN and MIN are also sent periodically during a session (power-up until power-down of the cellular telephone) as in conventional cellular telephone networks. The verification number, however, is sent only once as part of the first transmission of the session, to enable the subscriber to use the cellular telephone for the remainder of the session (i.e. from power-up to power-down). The cellular network computer receives the telephone number, ESN and MIN (as if the call was actually being placed) and verifies the received verification number against the verification number in the database for the particular subscriber based on the ESN. If the received verification number matches the stored verification number associated with the subscriber in the database, a single ring is returned to the subscriber indicating proper verification and the subscriber can continue to use the cellular telephone for the remainder of the session without having to transmit the verification number; otherwise, a speech message requesting enablement of the cellular telephone is returned to the subscriber.

The verification process is substantially similar when the subscriber travels out of the local cellular network area and is serviced by a non-local cellular network. In these circumstances, the subscriber is said to be "roaming". Every call made by a subscriber while roaming is a long distance call. Typically, a subscriber selects a long distance carrier such as AT&T or MCI when first establishing cellular service. The verification number may be provided to the long distance carrier when the verification number is given to the local cellular telephone company as described above. In response to a request for service from a roaming subscriber, a non-local cellular network forwards the request as a legitimate telephone call to the long distance carrier. The long distance carrier verifies the subscriber in substantially the same manner as described above when the request is the first request for service received from the non-local cellular network for that subscriber. In response to the long distance carrier not being adapted to perform the verification or as an additional security measure, the long distance carrier may forward the request to the subscriber's local cellular network for verification as described above. If the subscriber is verified and continues to roam by traveling into a third area serviced by yet another non-local cellular network during a session, the long distance carrier ultimately receives and performs the request without verification since the long distance carrier is aware that the subscriber is verified for that session. Alternatively, the long distance carrier may require verification each time the subscriber travels into the area of a new non-local cellular network whether or not the subscriber is verified for that session. The non-local cellular network need not know anything about the subscriber including the MIN, ESN or verification number to provide authenticated service, thereby making the process inexpensive, accurate (since the only database maintenance is done by the local cellular network and long distance carrier of the subscriber during the regular course of billing) and effective in a systematic way.

Any charges from a non-local cellular network submitted without verification of the subscriber will typically be refused thereby placing the cost of the "pirated service" onto the non-local cellular network allowing the unverified service. The risk of failing to get subscriber verification is thus placed squarely on the cellular telephone company that directly connects with the subscriber, and that risk serves as a substantial motivation and stimulus for cellular telephone companies to establish a substantially similar security system and to ensure verification is received before enabling a roaming cellular telephone to begin service.

It is apparent that as more local cellular networks and long distance carriers adopt the verification number security concept, the overall security of the nation's cellular telephone base increases.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENT

The preferred embodiment described hereinbelow is based on the use of a working telephone number as the verification number. It is to be understood that, for purposes of the present invention, the verification number need not be a telephone number but instead can be any multi-digit number of predetermined length that is uniquely assigned to a subscriber.

Figure 1:
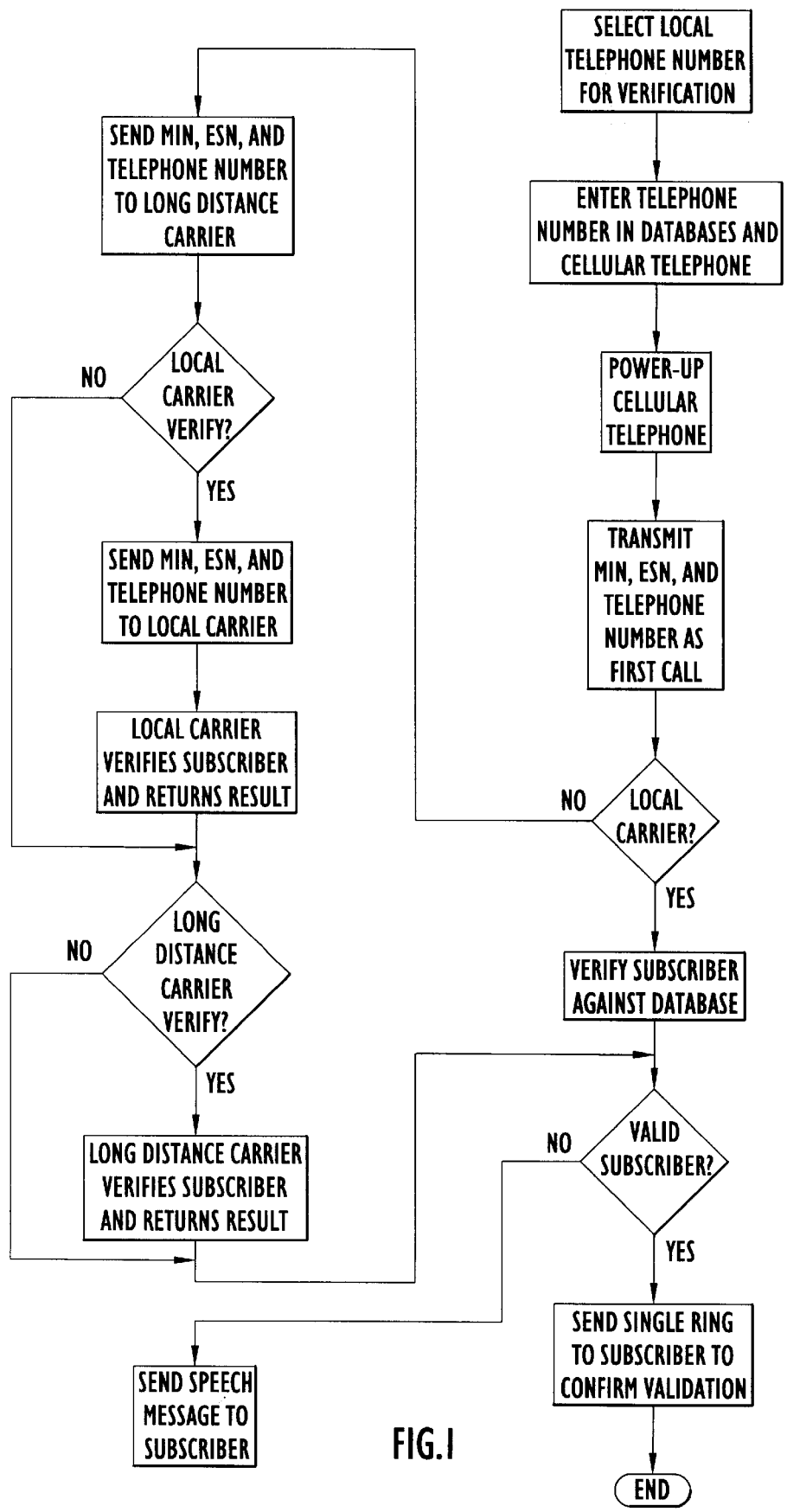
FIG. 1 is a procedural flowchart of the overall verification process for foiling cellular telephone cloning according to the present invention.
Figure 2:
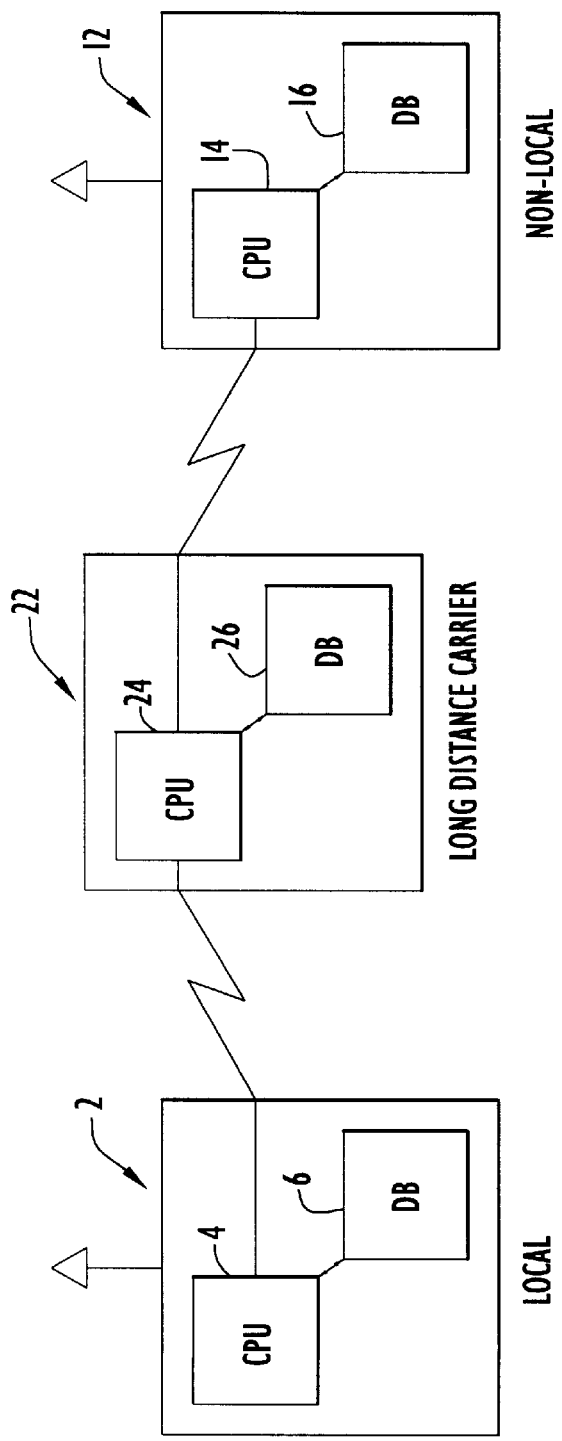
FIG. 2 is a block diagram of a typical overall configuration of cellular networks and a long distance carrier according to the present invention.
Figure 2:
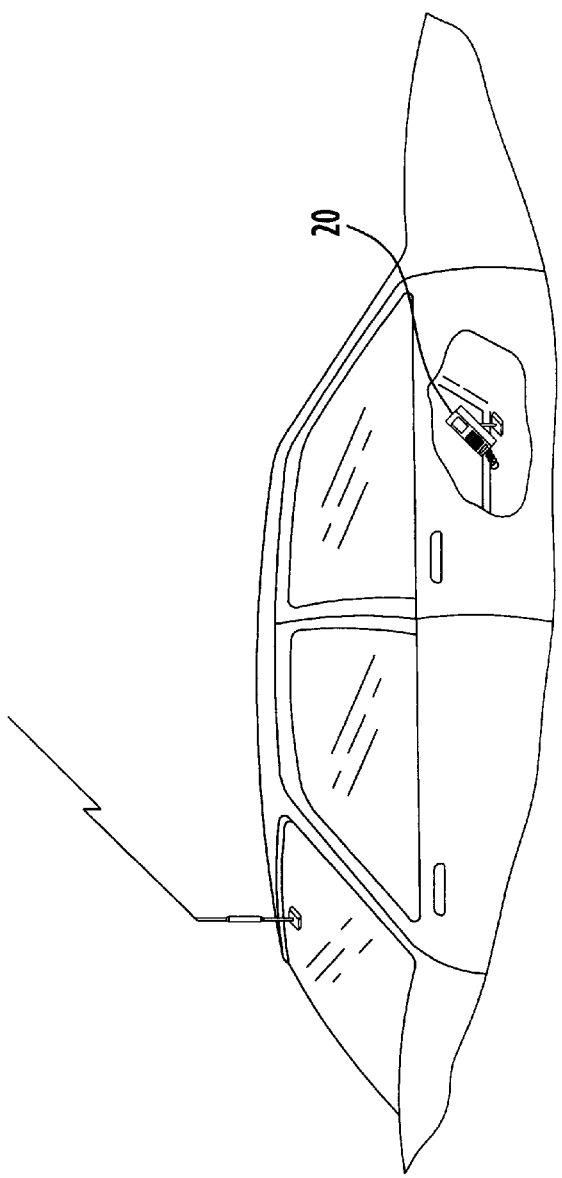
Figure 3:
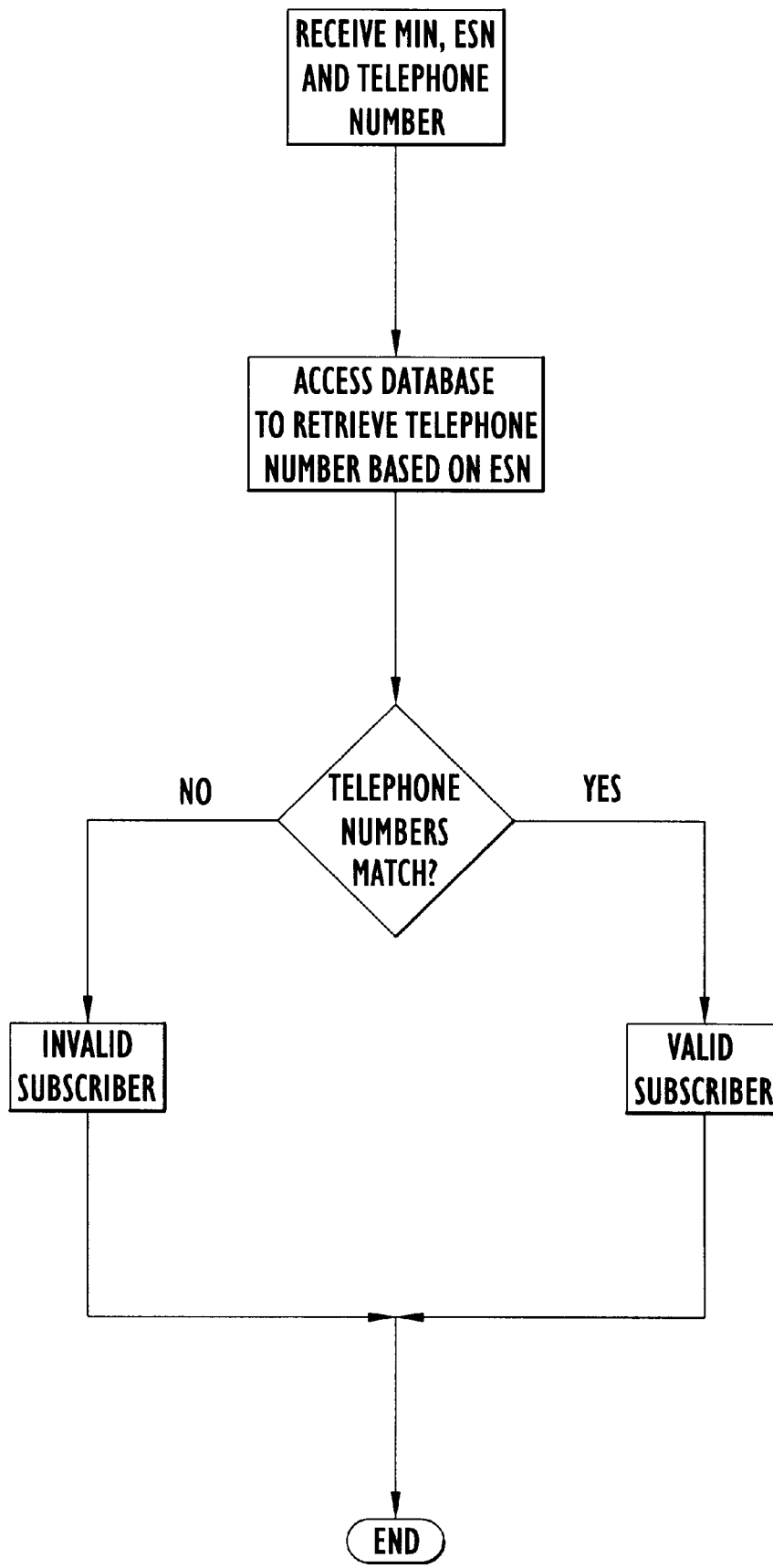
FIG. 3 is a procedural flowchart for verifying a subscriber against the database according to the present invention.

FIGS. 1–3 illustrate the method of foiling cellular telephone cloning in a typical cellular network arrangement according to the present invention. Initially, a cellular telephone company maintaining a local cellular communications network 2, contacts all of its subscribers to network 2 and requests that they visit an authorized representative prior to the next billing period. The visit may be further enticed by offering a small gift or discount. The subscriber, during the visit, provides the representative with a verification number, in this embodiment a telephone number, typically that of a local friend. The verification telephone number may be any valid telephone number in the local geographic area served by the operator of local cellular communications network 2 (i.e. a local call). The telephone number need not be, and is preferably not, another cellular telephone number as this limits the search area a thief must "tumble" to find the verification number. The subscriber provides a local telephone number for each cellular telephone 20 the subscriber owns. The telephone numbers provided by the subscriber are entered into local cellular communications network database 6 and are associated with electronic serial numbers (ESN) transmitted by the respective cellular telephones 20. The ESNs may be stored in local cellular communications network database 6 or used as a key to store and retrieve the telephone numbers for verification. The telephone numbers for verification are also provided to the subscriber's long distance carrier 22 and stored in long distance carrier database 26 in the same manner as described above. The long distance carrier (i.e., AT&T, MCI etc.) is typically selected by the subscriber at the initial establishment of cellular service. The telephone numbers may be further entered into an automatic dial register of respective cellular telephones 20 to enable automatic dialing of the telephone number by depressing the fewest possible keys. A written copy of the telephone numbers may be kept in the automobile glove compartment or other secure location for future reference.

The process of verifying a particular subscriber is now described. Specifically, upon power-up, cellular telephone 20 commences a start up procedure and displays symbols to the subscriber indicating when cellular telephone 20 is ready for use. Upon power-up and periodically during a session (power-up until power-down of the cellular telephone), cellular telephone 20 transmits the electronic serial number (ESN) identifying cellular telephone 20 to local cellular communications network 2, and a mobile identification number (MIN) identifying the cellular network to which cellular telephone 20 belongs (i.e. Cellular One, Bell Atlantic, etc.) as in conventional cellular telephone networks. The subscriber initiates the verification by depressing the automatic dial keys or manually entering the verification number as a first call of a session. The verification telephone number must be transmitted as part of the first call of every powered on session. Local cellular communications network computer 4 receives the verification number, MIN and ESN data as part of the verification call and compares the received verification number to the stored verification number in local cellular communications network database 6 that corresponds to the received ESN. If the received telephone number matches the telephone number in local cellular communications network database 6, the subscriber is verified and a single ring is returned to the subscriber's cellular telephone 20 to confirm verification. Calls may then be subsequently placed for the duration of the session without the need for repeating the verification. If the telephone numbers do not match, a speech message is sent to the subscriber's cellular telephone 20 requesting enablement of that cellular telephone. Since local cellular communications network database 6 stores telephone numbers based on the ESN, different cellular telephones may use the same telephone numbers for verification without detracting from the effectiveness of the security. Further, the initial call for verification does not incur a charge to the subscriber.

The process is substantially similar when a subscriber of a local cellular communications network travels to an area handled by a non-local cellular communications network (i.e. a cellular communications network to which the subscriber does not belong). Specifically, each cellular communications network 2, 12 (local and non-local) along with the subscriber's long distance carrier 22 implements the verification process as described above but stores only the verification numbers and ESNs (if not used as a key) of their own subscribers in respective local and non-local cellular communications network databases 6, 16 and long distance carrier database 26. The cellular communications networks and long distance carriers may vary in number and be arranged in any desired manner. In response to a subscriber placing a call, transmissions received at non-local cellular communications network 12 from a subscriber who belongs to local cellular communications network 2 (as determined from the MIN and ESN) are long distance calls and are therefore routed to the subscriber's long distance carrier 22 for verification by long distance carrier computer 24. Long distance carrier computer 24 verifies the subscriber in substantially the same manner as described above and a verification result indicating whether or not the subscriber is valid is sent to non-local cellular communications network 12. If a subscriber is verified, non-local cellular communications network 12 sends a single ring to the subscriber's cellular telephone 20 confirming verification and thereafter calls may be placed for the duration of a session without having to repeat the verification process. If the subscriber is not verified, non-local cellular communications network 12 sends a speech message to the subscriber's cellular telephone 20 requesting enablement of cellular telephone 20 and refuses to service the call.

The aforementioned process is substantially similar in response to the subscriber being verified and subsequently traveling during a session to areas serviced by still other non-local cellular networks. In response to a subscriber placing a call in an area serviced by another non-local cellular network, transmissions received at the other non-local cellular network are routed to long distance carrier 22 for verification as described above. Since long distance carrier 22 is aware that the subscriber is verified for the current session, the verification process need not be implemented and any calls subsequent to the initial verification during that session may be immediately serviced. Alternatively, long distance carrier 22 may require verification each time the subscriber travels to an area covered by a different cellular network as a precautionary measure regardless of whether or not the subscriber is verified for the session.

Typically, the same telephone company may provide the services of both long distance carrier 22 and local cellular network 2 thereby conceptually implementing the aforementioned verification process in both long distance carrier 22 and local cellular network 2, as they are the same entity. However, in circumstances where the subscriber uses a different telephone company as long distance carrier 22 or long distance carrier 22 is not adapted or able to perform the verification process, a call placed by a subscriber of local cellular network 2 and received at non-local cellular network 12 is forwarded via long distance carrier 22 to the subscriber's local cellular network 2 for verification by local cellular network computer 4. Local cellular network computer 4 performs the verification as described above and returns a verification result to non-local cellular network 12 via long distance carrier 22 indicating whether or not the subscriber is a legitimate subscriber. Non-local cellular network 12 based on the verification result either confirms the verification to b16 the subscriber by sending a single ring, or sends a message requesting verification in response to the subscriber not being verified as described above. Further, the verification performed by local cellular network 2 as described above may also be utilized as a default verification where long distance carrier 22 automatically forwards a request to local cellular network 2, or as an additional security measure where the subscriber must be verified by both long distance carrier 22 and local cellular network 2 before any service is rendered. In the latter case, long distance carrier 22 receives a verification result from local cellular network 2 and sends a verification result to non-local cellular network 12 indicating whether or not the subscriber is verified by both verifications.

The cellular networks, long distance carriers, telephones, computers and databases are all well known in the art and commercially available. The databases may be accessed by any of the known methods (i.e. query languages), and the computers may contain programs routine in the art for accessing the databases and comparing data (i.e. the telephone numbers). The speech messages may be stored and played back by any means known in the art and commercially available including audio recorders, speech synthesizers and any other devices capable of storing and playing such messages.

It will be appreciated that the embodiment described above and illustrated in the drawings represents only a few of the many ways of implementing foiling of cellular telephone cloning.

The verification numbers may be provided by subscribers to the cellular network and long distance carrier by any method or means of communication. Further, the verification number may be any multi-digit number (e.g., desirably five or more digits and preferably between seven and ten digits) or a valid telephone number local to the cellular network of the subscriber.

The verification numbers may be stored in any type of memory means capable of storing such numbers.

The present invention may be implemented with respect to any wireless communication system to identify subscribers. Further, the present invention may be implemented in a configuration having any number and arrangement of wireless communication systems.

The computer may be implemented by any processor, combination logic, or specialized circuitry capable of storage, retrieval and comparison of verification numbers.

The databases may be any type of database or memory capable of storing and retrieving the verification numbers and electronic serial numbers.

Computers of the varying communications networks and long distance carriers may communicate with each other by any means capable of enabling communication between computers.

From the foregoing description it will be appreciated that the invention makes available a novel method for foiling cellular telephone cloning wherein verification numbers given by subscribers to the cellular telephone company are maintained in a database to verify subscribers prior to placing calls during a "power-on to power-off" session.

Having described preferred embodiments of a new and improved method of foiling cellular telephone cloning, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method for foiling cellular telephone cloning in a communications network servicing subscriber telephones, said communications network including a database and a computer, said method comprising the steps of:

(a) selecting for each subscriber telephone a multi-digit verification number for identifying said each subscriber telephone;

(b) storing in said database said verification number and an identification code for each subscriber telephone;

(c) after each time that power is applied to the subscriber telephone, transmitting from each subscriber telephone the verification number and identification code of said each subscriber telephone to said communications network;

(d) verifying, by said computer, that said each subscriber telephone is a legitimate network subscriber by matching said transmitted verification number to the verification number stored in said database for said each subscriber telephone;

(e) in response to verification in step (d), permitting said each subscriber to place calls in said network without having to re-transmit said verification number for as long as power remains applied to said subscriber telephone; and (f) preventing said each subscriber telephone from placing calls via said network in the absence of verification of said each subscriber telephone as a legitimate subscriber in step (d).

2. The method of claim 1 further comprising the steps of:

(g) transmitting a single ring signal from said communications network to said each subscriber telephone in response to said transmitted verification number matching the verification number stored in said database for said each subscriber.

3. The method of claim 2 further comprising the step of:

(h) transmitting a message from said communications network to said each telephone subscriber in response to the absence of verification in step (g) that a verification number matching said stored verification number has been transmitted by said each subscriber telephone upon power being applied thereto.

4. The method of claim 3 wherein:

step (b) further comprises storing for automatic dialing at said each subscriber telephone the verification number of said each subscriber telephone; and step (c) further comprises automatically transmitting from said each subscriber telephone said verification number for that telephone to said communications network upon each application of power to that telephone.

5. The method of claim 1 wherein:

step (b) further comprises storing for automatic dialing at said each subscriber telephone the verification number of said each subscriber telephone; and step (c) further comprises automatically transmitting from said each subscriber telephone said verification number for that telephone to said communications network upon each application of power to that telephone.

6. The method of claim 1 wherein step (c) further includes transmitting said identification code when power is turned on to said subscriber telephone and thereafter at periodic intervals until power is turned off to said subscriber telephone.

7. A method for foiling cellular telephone cloning in a plurality of communications networks serviced by long distance carriers wherein each said communications network and long distance carrier includes a database and a computer and services respective groups of subscriber telephones, said method comprising the steps of:

(a) selecting for each subscriber telephone of a first of said communications networks a verification number identifying said each subscriber telephone;

(b) storing in respective databases of said first communications network and said long distance carrier said verification number and an identification code for all subscriber telephones serviced by said first communications network and said long distance carrier;

(c) transmitting from each subscriber telephone serviced by said first communications network the verification number and identification code of said each subscriber telephone to a second of said communications networks;

(d) routing said transmitted verification number and identification code from said second communications network to said long distance carrier;

(e) verifying, by said computer of said long distance carrier, that said each subscriber telephone is a legitimate subscriber by matching said routed verification number to the verification number stored in said database of said long distance carrier for said each subscriber telephone;

(f) transmitting a signal from said long distance carrier to said second communications network indicating whether or not said each subscriber is a legitimate subscriber; and (g) preventing said each subscriber telephone from placing calls via said second communications network in the absence of verification of said each subscriber as a legitimate subscriber as indicated by said signal.

8. The method of claim 7 wherein step (c) includes the step of transmitting said verification number from said each subscriber telephone each time, and only when, power is turned on to said subscriber telephone.

9. The method of claim 8 further comprising the steps of:

(h) transmitting a single ring signal from said second communications network to said each subscriber telephone in response to said routed verification number matching the verification number stored in said database of said long distance carrier for said each subscriber telephone.

10. The method of claim 9 further comprising the step of:

(i) transmitting a message from said second communications network to said each subscriber telephone of said first communications network in response to the absence of verification in step (h) that a verification number matching said stored verification number has been transmitted by said each subscriber telephone upon power being applied thereto.

11. The method of claim 10 wherein:

step (b) further comprises storing for automatic dialing at said each subscriber telephone the verification number of said each subscriber telephone; and step (c) further comprises automatically transmitting from said each subscriber telephone the verification number for that telephone to said second communications network upon each application of power to that telephone.

12. The method of claim 10 wherein:

step (b) further comprises storing for automatic dialing at said each subscriber telephone the verification number of said each subscriber telephone; and step (c) further comprises automatically transmitting from said each subscriber telephone the verification number for that telephone to said second communications network upon each application of power to that telephone.

13. The method of claim 10 wherein step (c) further includes transmitting said identification code when power is turned on to said subscriber telephone and thereafter at periodic intervals until power is turned off to said subscriber telephone.

14. A method for foiling cellular telephone cloning in a plurality of communications networks serviced by long distance carriers wherein each said communications network includes a database and a computer and services respective groups of subscriber telephones, said method comprising the steps of:

(a) selecting for each subscriber telephone of a first of said communications networks a verification number identifying said each subscriber telephone;

(b) storing in said database of said first communications network said verification number and an identification code for all subscriber telephones, respectively, serviced by said first communications network;

(c) transmitting from each subscriber telephone serviced by said first network the verification number and identification code of said each subscriber telephone to a second of said communications networks;

(d) routing said transmitted verification number and identification code from said second communications network to said first communications network via said long distance carrier;

(e) verifying, by said computer of said first communications network, that said each subscriber telephone is a legitimate subscriber by matching said routed verification number the verification number stored in said database of said first communications network for said each subscriber telephone;

(f) transmitting a signal from said first communications network to said second communications network via said long distance carrier indicating whether or not said each subscriber is a legitimate subscriber; and (g) preventing said each subscriber telephone from placing calls via said second network in the absence of verification of said each subscriber as a legitimate subscriber as indicated by said signal.

15. The method of claim 14 wherein step (c) includes the step of transmitting said verification number from said each subscriber telephone each time, and only when, power is turned on to said subscriber telephone.

16. The method of claim 15 further comprising the steps of:

(h) transmitting a single ring signal from said second communications network to said each subscriber telephone in response to said routed verification number matching the verification number stored in said database of said first communications network for said each subscriber telephone.

17. The method of claim 16 further comprising the step of:

(i) transmitting a message from said second communications network to said each subscriber telephone of said first communications network in response to the absence of verification in step (h) that a verification number matching said stored verification number has been transmitted by said each subscriber telephone upon power being applied thereto.

18. The method of claim 17 wherein:

step (b) further comprises storing for automatic dialing at said each subscriber telephone the verification number of said each subscriber telephone; and step (c) further comprises automatically transmitting from said each subscriber telephone the verification number for that telephone to said second communications network upon each application of power to that telephone.

19. The method of claim 15 wherein:

step (b) further comprises storing for automatic dialing at said each subscriber telephone the verification number of said each subscriber telephone; and step (c) further comprises automatically transmitting from said each subscriber telephone the verification number for that telephone to said second communications network upon each application of power to that telephone.

20. The method of claim 15 wherein step (c) further includes transmitting said identification code when power is turned on to said subscriber telephone and thereafter at periodic intervals until power is turned off to said subscriber telephone.

21. The method of claim 14 wherein:

step (d) further includes storing in said database of said long distance carrier said verification number and identification code for all subscriber telephones serviced by said long distance carrier;

step (e) further includes verifying, by said computer of said long distance carrier, that said each subscriber telephone is a legitimate subscriber by matching said routed verification number to the verification number stored in said database of said long distance carrier for each said subscriber telephone; and step (f) further includes said long distance carrier modifying said signal to indicate a legitimate subscriber in response to the verifications by said long distance carrier and said first communications network.

* * * * *